Patented Apr. 25, 1944

2,347,182

UNITED STATES PATENT OFFICE 2,347,182

PREPARATION OF POLYMERIC SULPHIDES

Donald Drake Coffman, Wilmington, Del., assignor to E. I. du Pont de Nemours & Company, Wilmington, Del., a corporation of Delaware No Drawing. Application January 21, 1941, Serial No. 375,367

7 Claims. (Cl. 260—79)

This invention relates to polymeric sulphides and more particularly to a new method for their manufacture.

The methods used most generally for the preparation of polymeric sulphides involve reaction of alpha,omega-alkylene dihalides with sodium sulphide, or the reaction of these dihalides with alkali metal salts of alpha,omega-alkylene dithiols. The types of polysulphides prepared by these reactions are definitely limited and expensive.

This invention has as an object a new method for preparing polymeric sulphides. A further object is a method by means of which polysulphides may be prepared from cheaper materials than those heretofore used. A further object is the production of new polysulphides not obtainable by prior processes. Further objects will appear hereinafter.

The above objects are accomplished by the process described hereinafter in which a dithiol of the general formula HSR'SH, wherein R' is a divalent organic radical, is reacted with a diene containing only ethylenic unsaturation. Both the divalent organic radical R' in the dithiol and the diene, with the exception of its unsaturated linkages, should be free from groups reactive with the thiol groups.

In the preferred method for carrying out the invention, substantially equimolecular quantities of a diene and of a dithiol, sealed together in a suitable container, are exposed to the light of a mercury arc, or are heated at temperatures ranging from 100 to 150° C., or both, until polymerization has proceeded to the desired stage. Generally, 48 hours, or longer, are required for the reaction to have progressed an appreciable extent. Some reactants, however, require as long as 12 days or more under the influence of light or heat to effect polymerization. When the polymerization has been accomplished, volatile materials, such as low molecular weight products and unreacted starting materials, can be removed by heating the polymerization products at temperatures ranging up to 250 or 300° C. under reduced pressure such as one to five millimeters of mercury.

The invention is further illustrated by the following examples in which the parts are by weight unless otherwise indicated.

Example I m-Benzenedithiol (14.5889 parts) and butadiene (5.5548 parts) are sealed under an atmosphere of nitrogen in a thick walled glass tube, and the tube contents are exposed to the light of a mercury arc located 15 inches away for 120 hours at 35° C. The tube is opened and the reactants are subjected to distillation at 265° C. under 4 mm. pressure until no more distillate can be removed by this treatment. Approximately 5 parts are removed. The yield is 75% of a clear, yellow polymer that is too viscous to flow at room temperature.

Example II

Bis-(mercaptoethyl) sulphide (9.7235 parts) and butadiene (3.410 parts) are sealed under an atmosphere of nitrogen in a glass tube. The tube is exposed at a distance of 15 inches from the source to the light of a mercury arc at a temperature of 35° C. for 120 hours. The tube is opened and the reactants are heated at a bath temperature of 185 to 265° C. under 4 mm. pressure to remove unreacted material and low molecular weight products. A 24% yield of a clear, yellow polymer that is exceedingly viscous at room temperature is obtained.

Example III

Ethanedithiol (2.1599 parts) and butadiene (1.240 parts), sealed in a glass tube, are exposed at 40° C. to the light of a mercury arc located 15 inches away for 288 hours. A clear, colorless polymer having a viscosity of 1 poise at 25° C. is obtained.

Example IV

Ethanedithiol (7.24 parts) and butadiene (4.16 parts), sealed in a glass tube, are heated in the dark at 120° C. for 288 hours. A clear, colorless polymer having a viscosity of approximately 10 poises at 25° C. is obtained.

Example V

Ethanedithiol (8.01 parts) and butadiene (4.60 parts) are sealed in a glass tube having a wall 3.5 mm. thick and exposed at a temperature of 120° C. to the light of a mercury arc at a distance of 15 inches from the source for 288 hours. At the end of this time the volatile constituents are removed by heating the reaction product in a bath at 300° C. under 1.5 mm. pressure. The polymer, a light-yellow, very viscous liquid, is obtained in 40% yield. The polymer is very soluble in benzene in which an ebullioscopic molecular weight determination indicated a value of 1100. The combination of heat and light as reaction catalysts in this case gives a product higher in molecular weight than is obtained when either light or heat is employed individually as catalysts.

*Example VI*

Decanedithiol-1,10 (29.656 parts) and butadiene (8.770 parts) are sealed in a glass tube and exposed at 35° C. at a distance of 15 inches from the source to the light of a mercury arc for 34 days. The tube is then opened and the contents are subjected to vacuum distillation. A portion of the product distills at 160° C. under 3.5 mm. pressure, but the non-volatile, viscous polymer is perfectly stable at a bath temperature of 300° C. under 3.5 mm. pressure. A 50% yield of alcohol-soluble polymer is obtained. The molecular weight of this polymer (ebullioscopy in benzene) is 680.

*Example VII*

Decanedithiol-1,10 (9.60 parts) and butadiene (2.52 parts) are sealed in a glass tube and heated in the dark at 120° C. for 288 hours. At the end of this time the volatile portion is removed by heating the reaction product at a bath temperature of 300° C. under 2 mm. pressure. The polymer is a light brown, viscous product. An ebullioscopic molecular weight determination in benzene gives a value of 726. This is only slightly higher than the molecular weight of the product obtained by employing the same reactants using ultraviolet light as the catalyst.

*Example VIII*

Decanedithiol-1,10 (9.14 parts) and butadiene (2.47 parts) are sealed in a glass tube, heated at 120° C. and exposed at a distance of 15 inches from the source to the light of a mercury arc for 288 hours. A clear, yellow polymer, slightly more viscous than the products obtained when either heat or light alone are used as catalysts, is obtained.

*Example IX*

Ethanedithiol (2.2688 parts) and vinylcyclohexene-3 (2.6050 parts), sealed in a glass tube, are exposed at 35° C. at a distance of 15 inches from the source to the light of a mercury arc for 288 hours. A colorless, very viscous product is obtained.

Ethanedithiol (2.2832 parts) and vinylcyclohexene-3 (2.6217 parts) are sealed in a glass tube and heated at 120° C. in the dark for 288 hours. A colorless, very viscous polysulphide is obtained. This is combined with the product obtained using ultraviolet light as the reaction catalyst. The combined reaction products are heated at 260° C. under 5 mm. pressure until all the volatile material is removed. An 87% yield of a light yellow, transparent polymer having a viscosity of between 10 and 20 poises at 25° C. is obtained. An ebullioscopic molecular weight determination in benzene indicates a value of 1060.

*Example X*

Ethanedithiol (2.2595 parts) and vinylcyclohexene-3 (2.5944 parts), sealed in a glass tube and maintained at a temperature of 120° C., are exposed 15 inches from the source to the light of a mercury arc for 288 hours. A clear, yellow polymer slightly more viscous than the one described in Example IX is obtained.

*Example XI*

Decanedithiol-1,10 (2.9225 parts) and vinylcyclohexene-3 (1.5314 parts) are sealed in a glass tube which is exposed at a distance of 15 inches from the source to the light of a mercury arc at a temperature of 35° C. for 240 hours. A cloudy, colorless, gelled polymer is obtained that is soluble in benzene, carbon tetrachloride, dioxane, and ethyl acetate, but is insoluble in water, acetone, or methanol. The gelled polymer is purified by dissolving it in carbon tetrachloride from which solution it is precipitated by the addition of acetone and subsequently washed several times with acetone by decantation. The polymer is then dried in a 60° C. oven; it is molten at this temperature but resolidifies at 25° C. A molecular weight determination made ebullioscopically in benzene indicates a value of 1180.

*Example XII*

Decanedithiol-1,10 (1.8384 parts) and vinylcyclohexene-3 (0.9635 part) are sealed in a glass tube and heated in the dark at 120° C. for 288 hours. A cloudy, colorless, very viscous polymer of about the same viscosity as the polymer described in Example XI is obtained.

*Example XIII*

Decanedithiol-1,10 (18,275 parts) and vinylcyclohexene-3 (9.578 parts) are sealed in a glass tube maintained at 120° C., and exposed at a distance of 15 inches from the source to the light of a mercury arc for 288 hours. A very clear, yellow polymer of about the same viscosity as the polymer described in Example XII is obtained.

*Example XIV* m-Benzenedithiol (6.4632 parts) and cyclopentadiene (3.004 parts) are intimately mixed in a soft glass bottle and exposed at a distance of 15 inches from the source to the light of a mercury arc at 35° C. for 48 hours. At the end of that time the reaction product is very viscous and flows with difficulty at room temperature.

*Example XV* m-Benzenedithiol (5.998 parts) and 1,2-bis-(vinyloxy) ethane (6.6744 parts) are mixed in a soft glass bottle, stoppered, and exposed at a temperature of 35° C. and at a distance of 15 inches from the source to the light of a mercury arc for 48 hours. A clear, colorless, very viscous polymer is obtained. The polymer is then heated at 200° C. for 32 hours, after which it is exceedingly viscous and does not flow at room temperature.

The reaction can be carried out in the presence of a peroxide catalyst, in which case it is probable that the constitution of the polymeric sulphide is somewhat different. In the presence of a peroxide catalyst or of oxygen, the sulphur will predominantly join to the "outer" carbon atom, contrary to Markownikoff's rule. In the absence of a peroxide or in the presence of an antioxidant, the sulphur will predominantly join to the "inner" carbon atom, in accordance with Markownikoff's rule. See Jones and Reid, J. Am. Chem. Soc. 60, 2452 (1938). In the presence of a peroxide, the main reaction may therefore be indicated by:

where $R^2$ is zero or a divalent organic radical. In the absence of a peroxide catalyst, the main reaction may be indicated by:

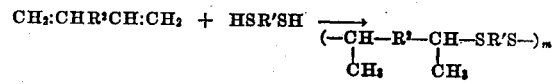

However, in either instance the general formula of the polymeric sulphide is R.S.R'S where the organic radicals R and R' may be the same or different depending upon the selection of the reactants. It is probable, however, in either instance that a mixture of polymers corresponding to both of the indicated structures is obtained.

Polysulphides not heretofore prepared can be made by the present process by reacting a diene with a dithiol of the formula $HSR^3XR^3SH$ in which the divalent radical —$R^3$—X—$R^3$— equals R' and X is oxygen or sulphur, or by reacting cyclic dienes or vinylcyclohexene-3 with a dithiol.

Dienes, in addition to those mentioned, which are useful in the practice of this invention include butadiene-1,3, allene, isoprene, 2,3-dimethylbutadiene-1,3, diisobutenyl, 1,4-dimethylbutadiene-1,3, pentadiene-1,3, hexadiene-1,5, cyclohexadiene, divinylformal, divinyl acetal, and divinyl sulphide.

Further examples of suitable dithiols comprise propanedithiol, butanedithiol, pentanedithiol, hexanedithiol, heptanedithiol, octanedithiol, nonanedithiol, hendecanedithiol, dodecanedithiol, hexadecanedithiol, heptadecanedithiol, octadecanedithiol, nonadecanedithiol, eicosanedithiol, heneixosanedithiol, doeicosanedithiol, p-xylylenedithiol, p-beta,beta'-dithioldiethylbenzene, and others. Furthermore, a mixture of several dithiols and dienes, as long as the dithiols and dienes are present in substantially equimolecular quantities, can be polymerized together. The thiol groups may be on primary, secondary, tertiary, or any two of the three aforementioned carbon atoms.

Either the diene or the dithiol compounds or both can contain hetero atoms, such as oxygen, sulphur, and tertiary nitrogen, in the chain. This is illustrated by Example XV in which 1,2-bis-(vinyloxy)ethane, a compound containing two ether oxygens, is employed.

The present method of preparing polymeric sulphides comprises the addition of dithiols, in which the thiol groups are joined to a divalent organic radical, to dienes containing only ethylenic unsaturation using heat or ultraviolet light, or a combination of both, as addition catalysts to accelerate polymerization which proceeds either not at all or only very slowly at room temperature in the absence of ultraviolet light. Temperatures ranging from 50° C. to 300° C. can be used to force the polymerization provided the pyrolysis temperature of the reactants and of the polymer is not reached. When ultraviolet light alone or both ultraviolet light and heat are used as catalysts, suitable reactor vessels that will permit irradiation of the reactants are employed. With heat as a catalyst, reactor vessels of several types can be used satisfactorily as long as the reactor vessel is inert toward the thiol and sulphide groups. The reaction can be carried out at atmospheric, sub-atmospheric or superatmospheric pressure. When one or both reactants are low boiling, or when elevated temperature is used, it is advantageous to operate in a closed vessel. Working at atmospheric pressure, if desired under reflux, is entirely satisfactory in other cases. A vessel from which the air has been evacuated or replaced by an inert gas may be used. The polymerization may also be effected either in the absence or presence of a solvent. When a solvent is used, it must be inert toward thiols, dienes, and sulphide groups. The dithiols are readily prepared by the reaction of alpha,omega-alkylene dihalides with either sodium or potassium hydrogen sulphide. Aromatic dithiols can be prepared in excellent yields from the corresponding aromatic disulphonic acids according to known methods.

The process of this invention provides a new method for preparing polysulphides and makes possible the preparation of polymeric sulphides from cheap and readily available starting materials. This process is furthermore advantageous in that new polymeric sulphides not obtainable by other methods may be prepared. The polymeric sulphides are useful in many fields. They can, for instance, be oxidized to polysulphones according to the process of U. S. Patent 2,201,884 and they can also be converted to polysulphonium derivatives which are water-soluble and useful, for example, in the treatment of textiles. The polymeric sulphides are also useful adjuvants for petroleum products, particularly as corrosion inhibitors in lubricating oils.

As many apparently widely different embodiments of this invention may be made without departing from the spirit and scope thereof, it is to be understood that I do not limit myself to the specific embodiments thereof except as defined in the appended claims.

I claim:

1. A process for making polymeric sulphides which comprises reacting a mixture of a dithiol and a diene hydrocarbon containing only ethylenic unsaturation by subjecting said mixture to heat, and continuing the reaction at least 48 hours until a viscous to solid polymer is obtained, said dithiol being of the general formula HSRSH in which R is a divalent hydrocarbon radical.

2. The process set forth in claim 1 in which said mixture is reacted in the substantial absence of oxygen.

3. A polymeric sulphide which consists of a viscous to solid product and which is the reaction product of a dithiol and vinylcyclohexene-3.

4. A polymeric sulphide which consists of a viscous to solid product and which is the reaction product of ethanedithiol and vinylcyclohexene-3.

5. A polymeric sulphide which consists of a viscous to solid product and which is the reaction product of decanedithiol and vinylcyclohexene-3.

6. A polymeric sulphide which consists of a viscous to solid product and which is the reaction product of metabenzenedithiol and vinylcyclohexene-3.

7. A process for making polymeric sulphides which comprises reacting a mixture of a dithiol and a diene hydrocarbon containing only ethylenic unsaturation by subjecting said mixture to heat and ultra-violet light, and continuing the reaction at least 48 hours until a viscous to solid polymer is obtained, said dithiol being of the general formula HSRSH in which R is a divalent hydrocarbon radical.

DONALD DRAKE COFFMAN.